Feb. 24, 1942.  B. V. MITCHELL  2,273,977

VULCANIZED RUBBER JOINT

Filed Aug. 21, 1940

Inventor
Byron V. Mitchell,
By Church & Church
His Attorneys

Patented Feb. 24, 1942

2,273,977

UNITED STATES PATENT OFFICE 2,273,977

VULCANIZED RUBBER JOINT

Byron V. Mitchell, Jamaica, N. Y.

Application August 21, 1940, Serial No. 353,586

2 Claims. (Cl. 36—14)

This invention relates to vulcanized rubber joints.

The primary object of the invention is to form or produce a vulcanized rubber joint wherein the rubber is vulcanized in situ by the application of heat generated at a point within the composite object.

Another object is to provide a vulcanized rubber joint especially adapted for use in connection with leather articles in that the heat which is applied to the rubber in the vulcanizing step may be accurately controlled so as not to have any detrimental effect upon the leather.

Still another object of the invention is to provide a vulcanized rubber joint wherein the rubber constituting the joint is mechanically interlocked with the body in which the joint is formed.

A still further object of the invention is to provide a vulcanized rubber joint for securing the sole of a shoe to the upper of the shoe or for securing a repair sole on a shoe.

Still another object is to provide a vulcanized rubber joint between the sole of a shoe and the upper of the shoe to form a water-tight joint or seam connecting the sole and upper.

Another object of the invention is to provide a shoe sole with a length of rubber exposed at one surface thereof which can be vulcanized in situ so that the vulcanized rubber may either serve as a portion of the tread surface of the sole or if disposed at the inner surface of the sole during the vulcanization step can be utilized for attaching the sole, as a repair element, to the original sole of a shoe. In such instances as either of these, the rubber vulcanized in situ in the sole may also be mechanically interlocked with the sole, if desired.

A still further object is to provide a vulcanized joint between the original sole of a worn shoe and a repair sole therefor by means of vulcanizing uncured rubber between the two soles through the application of heat generated by means of electrical resistance elements embedded in the repair sole.

With these and other objects in view, the invention consists in certain details of construction and combinations and arrangements of parts, all as will hereinafter be more fully described, and the novel features thereof particularly pointed out in the appended claims.

In the accompanying drawing—

It is a well-known fact that the degree of heat required for vulcanizing rubber can, under various conditions, practically destroy the tissues or fibers of leather and, for this reason, the present invention is especially adapted for joining vulcanized rubber in leather articles, particularly the soles of shoe. However, as will hereinafter be more fully set forth, certain phases of the invention may be advantageously used in providing a vulcanized rubber joint between bodies of material other than rubber and leather—for instance, two bodies of rubber.

Figure 1:
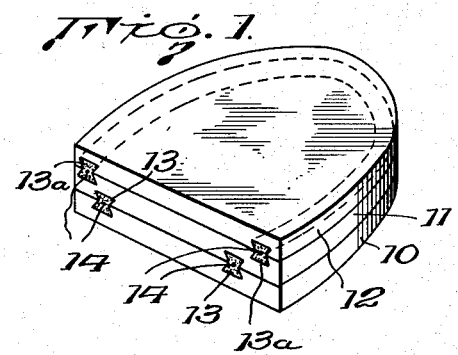
Figure 1 is a perspective view illustrating the heel of a shoe having a rubber sole secured to the leather portion of the heel by vulcanized rubber strips interlocked with the individual sections of the heel, said strips having been vulcanized in situ.

Referring to Fig. 1, there is illustrated the heel of a shoe consisting of a layer of leather 10, on which are superimposed layers of rubber 11 and 12. The layer of rubber 11 is secured to the layer of leather 10 by a vulcanized rubber joint 13, while a similar joint 13ᵃ is formed between the two layers of rubber 11 and 12. In forming these joints, the surfaces of the heel sections to be joined are channeled, with the channels in each two juxtaposed sections located so as to register with one another, after which the channels in each two members are filled with uncured rubber in which there is embedded a heating element 14. Preferably, this heating element is in the form of an electrical conductor of high electrical resistivity, so that by passing an electric current through the conductor heat can be generated interiorly of the raw rubber to raise the latter to vulcanizing temperature. It will be appreciated that the heat generated in this fashion can be accurately controlled and, hence, only sufficient heat will be generated within the rubber to properly vulcanize the latter. In other words, as soon as the rubber is properly vulcanized, the heating step can be terminated, so that no detrimental effects are produced on the surrounding bodies and, particularly, the leather. In forming the channels in the sections of the heels, it is also preferred to so form them that the rubber, when vulcanized, will be wedged in the respective sections. For instance, the side walls of the channels may be undercut, as illustrated, to produce a dove-tailing effect. In actual practice, this mode of forming a vulcanized rubber joint between the sole portion of a shoe and the upper of the shoe has proven highly advantageous, particularly in the repair of rubber footwear, for instance, rubber boots. In this connection, it might be added that, while only the heel portion of an article of footwear is shown in Fig. 1, it will be understood that the sole proper of a rubber boot can be repaired in the same manner as the layer of rubber 12 is secured to the layer of rubber 11 in the heel illustrated in Fig. 1.

Figure 2:
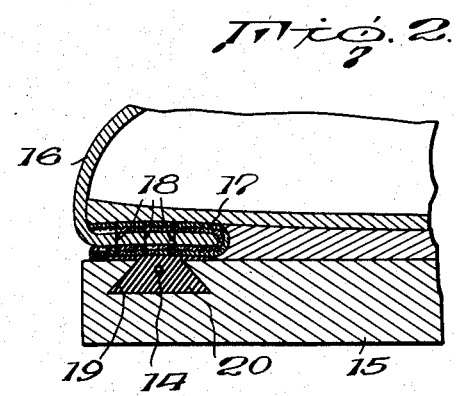
Fig. 2 is a sectional view taken transversely of the toe portion of a shoe illustrating a vulcanized joint vulcanized in situ for securing the sole to the upper.

A modified form of the invention is illustrated in Fig. 2 in connection with producing a watertight seam or joint between a leather sole 15 and the leather upper 16 of a shoe. In accordance with usual shoe manufacturing practices, the lower edge of the upper 16 is turned inwardly but, in accordance with the present invention, there is attached to this inturned portion a tape or covering of rubberized fabric 17. This rubberized tape or fabric preferably covers both surfaces of the inturned portion of the leather upper and may be stitched to the upper as indicated at 18. As in the embodiment of the invention shown in Fig. 1, the sole 15 has an undercut channel 19 extending around the upper surface thereof and, in forming this joint, the channel 19 is filled with uncured rubber 20, in which there is embedded the heating element 14. Thus, the upper surface of the uncured rubber 20 is exposed so that it can be forced into contact with what would otherwise be the exposed surface of the rubberized tape or fabric 17. With the sole and upper positioned against one another in this fashion and with the proper pressure, the uncured rubber is raised to vulcanizing temperature through the medium of the heating element 14 which may be in the form of an electrical conductor arranged in the coil extending through the uncured rubber or along the channel 19. If desired, a rubber cement may be applied to the surface of the leather upper 16 before the rubberized fabric 17 is sewn thereon but, in any event, when the vulcanizing step has been carried on the proper length of time, a thoroughly watertight seam or joint will be formed due to the fact that the heat generated in element 14 will effect vulcanization of the rubber in the rubberized fabric 17. It will be understood that the interior construction of the shoe, such as the insole, forms no essential part of the present invention and, hence, this interior portion has been more or less diagrammatically illustrated.

Figure 3:
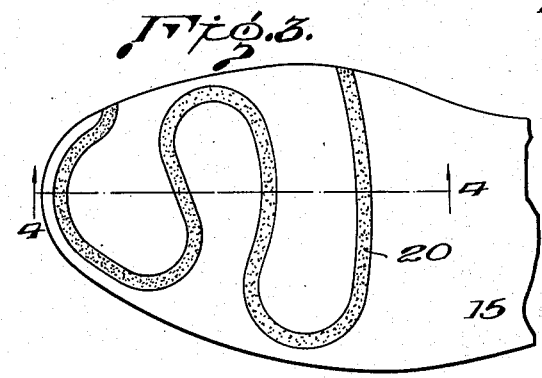
Fig. 3 is a bottom plan view of a shoe sole having a strip of vulcanized rubber joined thereto by being embedded therein, although being exposed at the surface of the sole.
Figure 4:
Fig. 4 is a sectional view on the line 4—4 of Fig. 3.

Figs. 3 and 4 illustrate a further embodiment of the invention as practised in providing a leather shoe sole 15 with anti-slipping surfaces. In this instance, the joint is produced by forming a channel in the wearing surface of the sole, the channel preferably having undercut side walls, and filling this channel with a mass of uncured rubber 20, in which the heating element 14 is embedded. By raising the temperature of the uncured rubber to the proper degree of heat through the medium of heating element 14, the rubber is vulcanized in situ, in the sole. Here, again, heating of the uncured rubber from its interior and the accurate control of the heat so applied will prevent the leather being damaged. Also, attachment of the vulcanized rubber to the sole is enhanced by the dove-tail cross-section of the channel forming a mechanical interlock between the vulcanized rubber inlay and the sole. While a continuous, vulcanized rubber joint or inlay is illustrated, it will be understood that the body of rubber need not be of the particular shape shown, nor continuous.

Figures 5, 6:
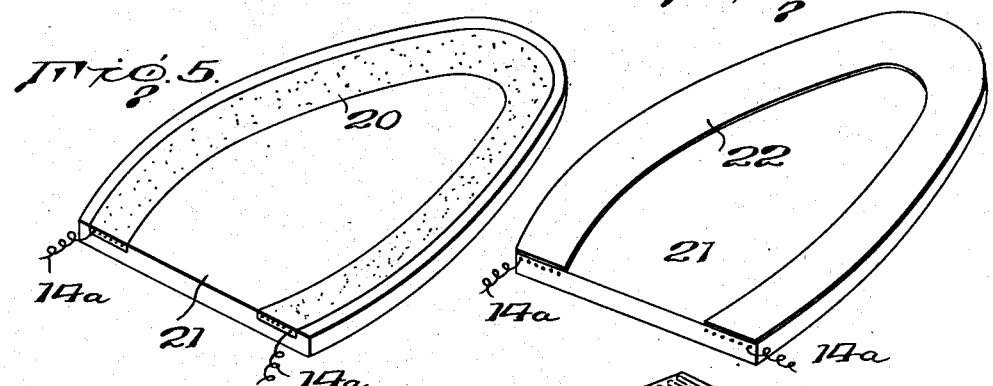
Fig. 5 is a perspective view illustrating a shoe sole adapted for repair purposes which may be secured on the worn sole of a shoe by a vulcanized joint.
Fig. 6 is a similar view illustrating a repair sole in which the heat-generating elements are embedded within the repair sole proper.

Figs. 5 and 6 illustrate what, for convenience, are referred to as repair soles for shoes in that they are adapted to be secured to the sole of a worn shoe. For instance, as shown in Fig. 5, the repair sole 21, as furnished by the manufacturer thereof to the shoe-repairing trade, may have embedded in one surface thereof a body of uncured rubber 20 which preferably extends around, but is slightly spaced from, the edge of the repair sole. Embedded in this strip or body of uncured rubber is a suitable electrical conductor 14ª whose ends extend a sufficient distance to permit their attachment to suitable lines for passing electric current through the element 14ª. As stated, this strip or body of rubber with electrical conductor 14ª preferably constitutes a part of the repair sole as furnished to the shoe-repairing trade. Consequently, in repairing a worn shoe sole, the repairer need only impose the repair sole 21 on the worn shoe sole and, by the proper application of pressure, while current is passing through the resistance element 14ª, the repair sole will be vulcanized to the worn sole of the shoe. In Fig. 6, the repair sole 21, as produced by the manufacturer thereof, merely has the electrical resistance element 14ª embedded therein. With a sole of this type, the shoe repairer would interpose uncured rubber between the repair sole and the sole to be repaired. Pressure would then be applied to the superimposed bodies while passing a proper electrical current through the conductor 14ª. The uncured rubber that is interposed between the original shoe sole and the sole 21 of Fig. 6 may take the form of a strip extending around the edge of the wall, as illustrated in Fig. 5, although it is preferred that a sheet of uncured rubber substantially corresponding in shape to the sole be used. This is preferred because if only a strip is disposed around the edge of the sole in Fig. 6, the pressure imposed thereon during the vulcanizing step may tend to extrude a major portion of the rubber from between the two soles thus weakening the joint. However, when the entire sole is covered with uncured rubber for purposes of forming the joint, a substantially perfect union will be obtained between the two soles. This is true because the action of a shoe press has a tendency to centralize the highest point of pressure at the center of the sole and thus, if there is a tendency of the rubber at the edge of the sole to be extruded, it will be supplanted or supplemented by rubber forced from the central portion of the area of the soles. It has also been found, in actual practice, that the heat from the resistance element 14ª tends to travel inwardly of the joint between the two soles and substantially totally cures the rubber for some distance inwardly from the area immediately adjacent the resistance element. In practice, perfect vulcanization has been obtained for approximately one inch inwardly from the edge of the sole and an eighty per cent perfect vulcanization for the next half inch toward the center. Although the center will be found to be only partially vulcanized, nevertheless, on the whole, a very excellent joint is obtained.

Figure 7:
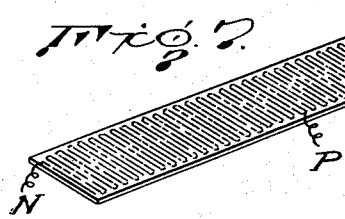
Fig. 7 is a fragmentary view, somewhat enlarged, illustrating the preferred form of the heat-generating resistance element that is preferred in forming the various types of joints illustrated herein.

In lieu of the coiled form of resistance element illustrated in Figs. 1 to 4, it is preferred to use, in connection with the joints of Figs. 5 and 6, a resistance element such as illustrated in Fig. 7. This resistance element is in the form of a woven tape-like member which may be made of any desired length or may be made in a continuous tape which may be severed into desired lengths. In this tape-like resistance element, a fine wire is used for the weft thread which is woven with warp threads that may be formed of cotton, asbestos, or the like. The fine wire constitutes the resistance element and, as the tape is of regular formation, in that there is a predetermined length of wire per unit of length of tape, it follows that each unit of length of tape will set up, for a given size wire, a predetermined resistance. Thus, this particular form of resistance element lends to a very accurate control of the heat developed in vulcanizing the joint so as to insure protection of the leather where leather articles are involved.

For instance, let it be assumed that the wire used in weaving the tape shown in Fig. 7 is such that one hundred inches of wire, when confined in a given area and energized with an electric current of 110 volts, will develop a temperature of 300° F. Further, let it be assumed that the tape shown in Fig. 7 is twelve inches long and has the positive lead wires P and negative lead wires N attached to its edge portions as illustrated—that is, one positive lead wire attached at one end with the other positive wire attached four inches from the opposite end and with one negative wire attached at said opposite end and the second negative wire attached four inches from the first-mentioned end. With the tape one inch wide and the wire crossing the tape twenty-five times each inch lengthwise thereof, it will be seen that each four inches of tape will be heated to 300° F.

This application is a continuation-in-part of applicant's pending application Serial No. 289,851.

What I claim is:

1. An article such as a boot or shoe having a water proof vulcanized rubber joint between its sole and its upper, said joint being composed of rubberized fabric disposed at opposite sides of the edge of said upper and a length of rubber on the sole in contact with the fabric on the upper, said fabric and rubber being secured by vulcanization to the upper and sole respectively, and the contacting surfaces of the fabric and rubber being vulcanized to each other.

2. An article such as a boot or shoe having a water-tight vulcanized rubber joint between its sole and its upper, said joint being composed of a length of rubber embedded in an undercut recess in said sole with the rubber vulcanized to the wall surfaces of the recess and a length of rubberized fabric folded upon itself embracing opposite sides of the edge of the uper, said rubberized fabric being vulcanized to the contacting surface of the upper and to the length of rubber embedded in the sole.

BYRON V. MITCHELL.